US007290089B2

(12) United States Patent
Parthasarathy et al.

(10) Patent No.: US 7,290,089 B2
(45) Date of Patent: Oct. 30, 2007

(54) EXECUTING CACHE INSTRUCTIONS IN AN INCREASED LATENCY MODE

(75) Inventors: Sivagnanam Parthasarathy, Carlsbad, CA (US); Andrew Cofler, Voreppe (FR); Lionel Chaverot, Sassenage (FR)

(73) Assignees: STMicroelectronics, Inc., Carrollton, TX (US); STMicroelectronics S.A. (FR)

( * ) Notice: Subject to any disclaimer, the term of this patent is extended or adjusted under 35 U.S.C. 154(b) by 485 days.

(21) Appl. No.: 10/270,753

(22) Filed: Oct. 15, 2002

(65) Prior Publication Data

US 2004/0073749 A1    Apr. 15, 2004

(51) Int. Cl.
*G06F 12/00* (2006.01)
(52) U.S. Cl. .................. 711/118; 711/128; 711/154
(58) Field of Classification Search ............... 711/118, 711/125, 128, 137, 140, 154; 713/320, 323, 713/324
See application file for complete search history.

(56) References Cited

U.S. PATENT DOCUMENTS

| 5,450,586 | A |   | 9/1995 | Kuzara et al. | |
|---|---|---|---|---|---|
| 5,590,368 | A | * | 12/1996 | Heeb et al. | 712/43 |
| 5,748,875 | A |   | 5/1998 | Tzori | |
| 5,819,050 | A |   | 10/1998 | Boehling et al. | |
| 5,854,929 | A |   | 12/1998 | Van Praet et al. | |
| 5,860,097 | A | * | 1/1999 | Johnson et al. | 711/125 |
| 5,860,106 | A | * | 1/1999 | Domen et al. | 713/324 |
| 5,870,588 | A |   | 2/1999 | Rompaey et al. | |
| 5,999,734 | A |   | 12/1999 | Willis et al. | |
| 6,006,022 | A |   | 12/1999 | Rhim et al. | |
| 6,182,206 | B1 |   | 1/2001 | Baxter | |
| 6,195,593 | B1 |   | 2/2001 | Nguyen | |
| 6,477,683 | B1 |   | 11/2002 | Killian et al. | |
| 6,477,697 | B1 |   | 11/2002 | Killian et al. | |
| 6,681,294 | B1 | * | 1/2004 | Kato et al. | 711/128 |
| 6,845,432 | B2 | * | 1/2005 | Maiyuran et al. | 711/154 |
| 6,961,276 | B2 | * | 11/2005 | Atallah et al. | 365/207 |
| 2002/0016887 | A1 | * | 2/2002 | Scales | 711/140 |
| 2002/0103977 | A1 | * | 8/2002 | Ewoldt | 711/140 |
| 2004/0064663 | A1 | * | 4/2004 | Grisenthwaite | 711/169 |
| 2004/0098540 | A1 | * | 5/2004 | Itoh et al. | 711/118 |

OTHER PUBLICATIONS

Hennessy, John L. and Patterson, David A., "Computer Organization and Design: The Hardware/Software Interface," Morgan Kaufmann Publishers, Inc., 1998, pp. 569-570.*
"IEEE 100—The Authoritative Dictionary of IEEE Standards Terms," Seventh Edition, IEEE Press, 2000, pp. 859.*
Hartoog, Mark R., et al., "Generation of Software Tools from Processor Descriptions for Hardware/Software Codesign," Alta Group of Cadence Design Systems, Inc., 1997, 4 pages.

* cited by examiner

*Primary Examiner*—Matthew Kim
*Assistant Examiner*—Shane M Thomas
(74) *Attorney, Agent, or Firm*—Lisa K. Jorgenson; William A. Munck

(57) ABSTRACT

For instruction clusters for which no significant performance penalty is incurred, such as execution of hardware loops, a processor automatically and dynamically switches to a pipelined two-cycle access to an associated associative cache rather than a single-cycle access. An access involving more than one cycle uses less power because only the hit way within the cache memory is accessed rather than all ways within the indexed cache line. To maintain performance, the single-cycle cache access is utilized in all remaining instructions. In addition, where instruction clusters within a hardware loop fit entirely within a pre-fetch buffer, the cache sub-system is idled for any remaining iterations of the hardware loop to further reduce power consumption.

18 Claims, 3 Drawing Sheets

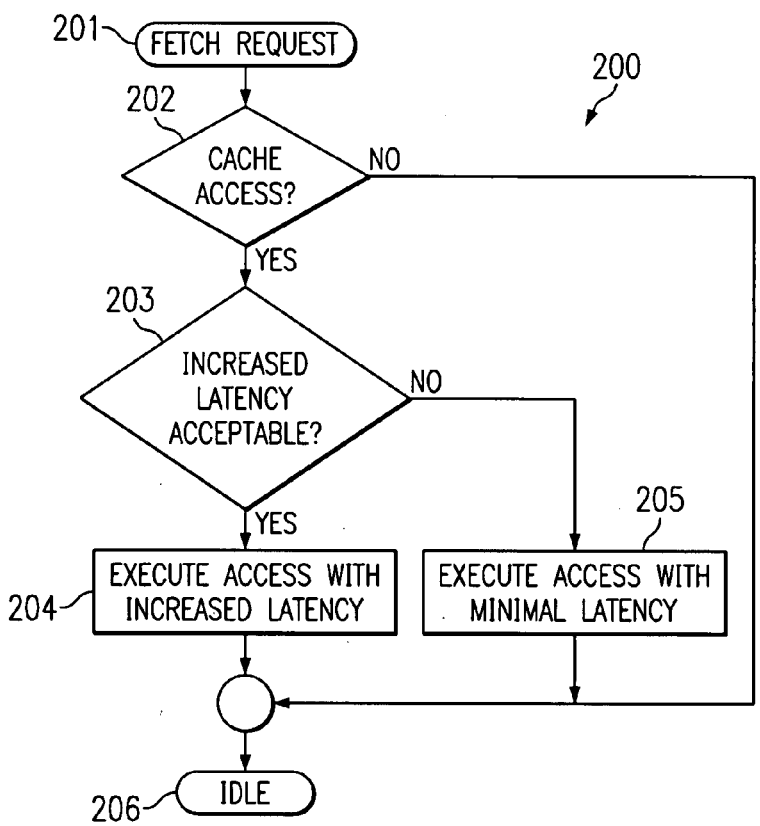
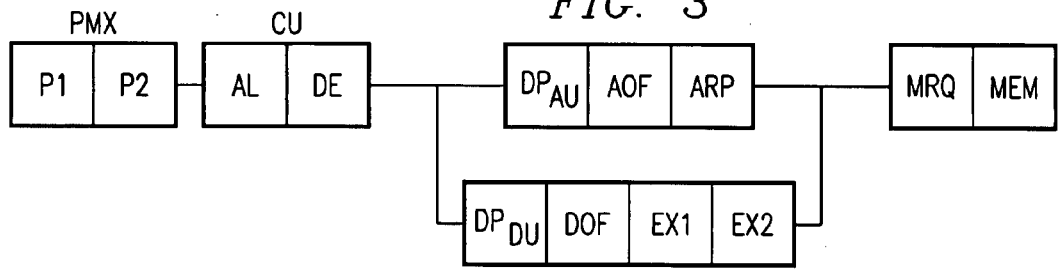

EXECUTING CACHE INSTRUCTIONS IN AN INCREASED LATENCY MODE

TECHNICAL FIELD OF THE INVENTION

The present invention is directed, in general, to performance/power tradeoffs in processor architecture and, more specifically, to reducing the power consumption of cache accesses within a processor without substantially degrading performance.

BACKGROUND OF THE INVENTION

Contemporary processors commonly employ caches to improve performance. Caching allows data and/or instructions to be pre-fetched and stored to memory accessible to execution units in fewer cycles than required to access main memory. Performance is thus improved by reducing the latency (delay) associated with retrieving required data or instructions. However, lower latency implies higher power consumption.

In some applications, however, power consumption by a processor is an important consideration. For instance, power consumption may be a significant concern for Customer Premises Equipment (CPE) for an Advanced Digital Subscriber Line (ADSL) communications link powered through a Universal Serial Bus (USB) connection, where the power available through the USB connection is constrained.

There is, therefore, a need in the art for improving the performance/power ratio of a processor by reducing power consumption without substantially degrading performance.

SUMMARY OF THE INVENTION

To address the above-discussed deficiencies of the prior art, it is a primary object of the present invention to provide, for use in a processor, a mechanism for automatically and dynamically switching to a two-cycle access latency for an associated set-associative cache from a single-cycle access latency for instruction clusters for which no significant performance penalty is incurred, such as execution of hardware loops. An access involving more than one cycle uses less power because only the hit way within the cache memory is accessed rather than all ways within the indexed cache line. To maintain performance, the single-cycle cache access is utilized in all remaining instructions. In addition, where instruction clusters within a hardware loop fit entirely within a pre-fetch buffer, the cache controller is idled for any remaining iterations of the hardware loop to further reduce power consumption.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 2 is a high level flowchart for a process of dynamically setting cache access latency to improve performance/power according to one embodiment of the present invention;

FIG. 3 depicts the pipeline for both single cycle cache accesses and two cycle cache accesses according to one embodiment of the present invention.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
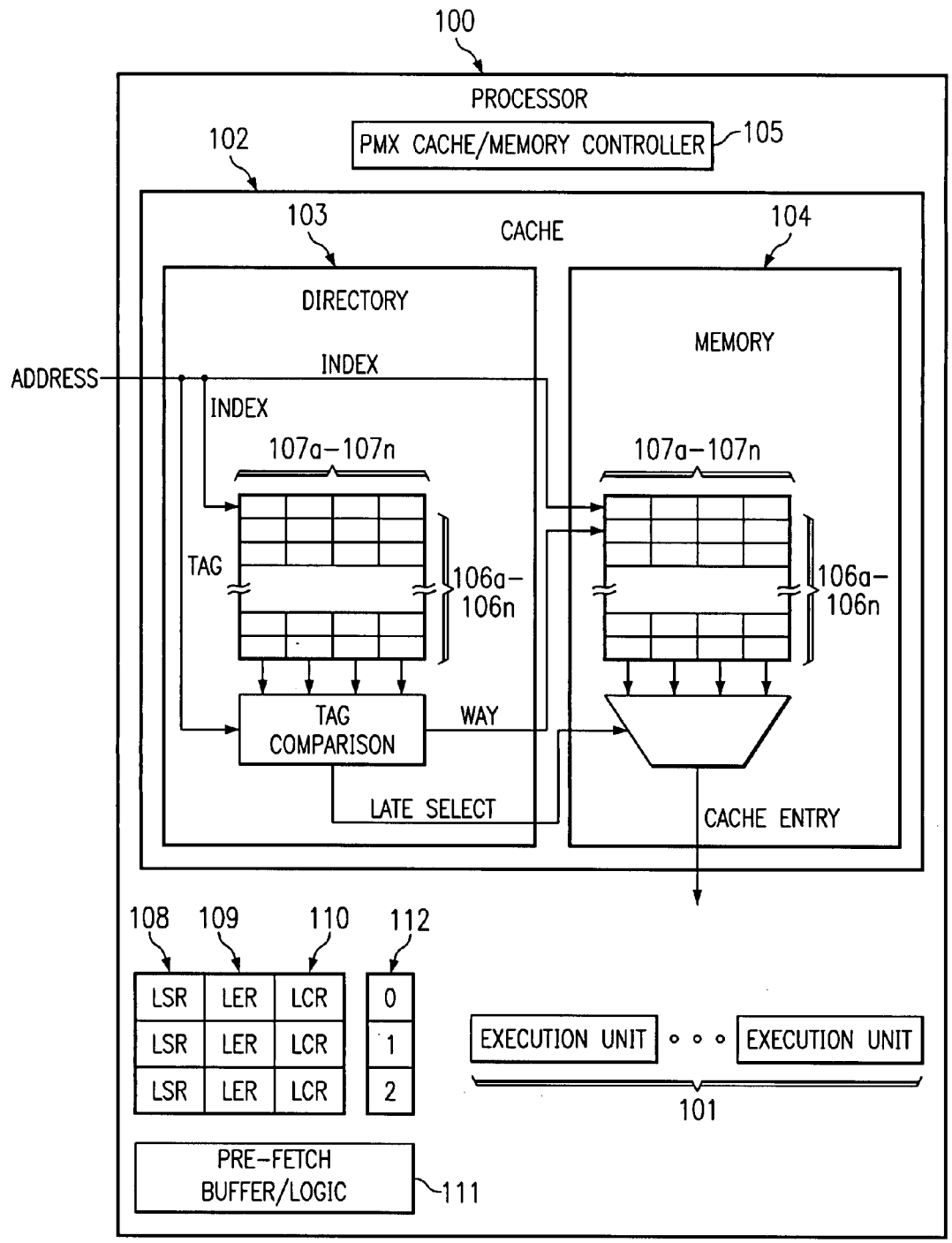
FIG. 1 depicts a high-level block diagram of a processor implementing performance/power improvements according to one embodiment of the present invention.

FIG. 1 depicts a high-level block diagram of a processor implementing performance/power improvements according to one embodiment of the present invention. Processor 100 includes one or more execution units 101 and at least one on-chip level one (L1) cache 102 between a system memory (not shown) and the execution unit(s) 101. Cache 102 may be a data cache, an instruction cache, or a combined data and instruction cache. In addition, although only one cache is depicted, processor may include independent data and instruction caches.

In the exemplary embodiment, cache 102 is an instruction (or program) cache, and processor 100 is a member of the ST 100 family of processors available from STMICROELECTRONICS, INC. In the particular example described herein, processor 100 is an S122 core based on a 16-bit/32-bit digital signal processing/microcontroller unit (DSP/MCU)

architecture that includes two complete parallel arithmetic logic units (ALUs) and provides full DSP/MCU capabilities. The processor is founded on a comprehensive 32-bit instruction set (GP32) plus a 16-bit instruction set oriented towards high code density (GP16) and another instruction mode, utilizing a 4×32-bit Scoreboarded (Very) Long Instruction Word (SLIW), offering an increased level of parallelism suitable for DSP operations.

The core implementing processor 100 also includes a program memory cache subsystem referred to as (P)rogram (M)emory E(X)tension (PMX). PMX provides a configurable level-1 program (instruction) cache and level-2 program memory. The level-1 program cache is 4-ways set associative, supporting cache memory sizes ranging from 4 kilobytes (KB) to 32 KB.

Those skilled in the art will recognize that, for simplicity and clarity, the complete structure and operation of processor 102 is not depicted or described. Instead, only so much of the structure and operation of processor 102 as is unique to the present invention or necessary for an understanding of the present invention is depicted and described herein.

Cache 102 is a set-associative cache including a cache directory 103, a cache memory 104, and a cache controller 105. With set-associative caches, a plurality of cache lines 106a-106n—typically indexed by a portion of the memory address—each include multiple ways 107a-107n within which all data or instructions having a corresponding index is stored. Tags, which are the remainder of the memory address, are employed within the cache directory 103 to distinguish entries within a given indexed cache line 106a-106n. Although set-associative caches are described herein, the present invention may also be employed with fully associative caches.

For performance reasons, processors typically perform cache accesses in a single cycle. The cache index is utilized to access an entire cache line 106a-106n within both the cache directory 103 and the cache memory 104, tag comparisons are performed within the cache directory 103 to identify the appropriate way 107a-107n, then a late select based on the tag comparisons is employed to output the correct way from the cache memory 104.

Pipelined cache accesses may alternatively be performed with a latency of two cycles, initially accessing the indexed cache line only within the cache directory 103 and performing tag comparisons to determine the correct way, then accessing only the "hit" way within the proper cache line for the cache memory 104. Such division of the cache access process nominally incurs a performance penalty of an additional cycle in latency. Since all ways belonging to the entire cache line within the cache memory 104 are read during a single cycle cache access, rather than only the correct way as in two cycle cache accesses, more power is consumed during single cycle cache accesses.

A significant portion of the performance improvement achieved with single cycle cache accesses involves reduction of the branch penalty, the latency associated with incorrect branch prediction, by one cycle. There are some program segments for which a two-cycle cache access may be performed without incurring a performance penalty, such as for instruction clusters in hardware loops described in further detail below. However, to maintain good performance for other program segments, any switching between one and two cycle cache accesses should be dynamic, rather than fixed at boot-up, soft reset or other start-up sequence. In addition, determination of whether one or two cycle cache accesses should be performed should not be left to the programmer by modifying the cache access instruction, since such instruction-based features frequently go unused by programmers.

In the present invention, therefore, the cache controller 105 dynamically sets cache accesses to either one cycle for highest performance or two cycles for the lowest power consumption. In two cycles mode, only the selected way of the cache memory is activated, while the other three ways remain inactive, resulting in significant power savings. The power consumption for a single-cycle access is about 3 times higher than that of a two-cycle access. The power savings may be attributed to the fact that the first cycle is used in the case of two-cycle access to access the cache tags and generate a hit signal for the way select, which is then used to select the way within cache memory 104 during the next cycle to read the data. By contrast, both the tags within cache directory 103 and all four ways within cache memory 104 are selected during the same cycle in the case of one-cycle cache accesses. Comparative power consumption estimates, in micro-Watts per mega-Hertz (µW/MHz), for both 32 and 16 KB cache sizes are shown below in TABLE I:

TABLE I

| Power Consumption (µW/MHz) | 4-Way 32 KB | 4-Way 16 KB |
|---|---|---|
| 1-Cycle access (High Performance) | 470 µW/MHz | 438 µW/MHz |
| 2-Cycle access (Low Power) | 179 µW/MHz | 171 µW/MHz |

FIG. 2 is a high level flowchart for a process of dynamically setting cache access latency to improve performance/power according to one embodiment of the present invention. The process 200 is executed within processor 100, and begins with receipt of an instruction fetch request for execution (step 201). A determination is made regarding whether the instruction fetch request involves a cache access (step 202), and, if so, a determination is made regarding whether the instruction could be executed with increased latency (i.e., in two cycles rather than one) without incurring a substantial performance penalty (step 203).

If the latency of a cache access may be increased without incurring a substantial performance penalty, the cache access is executed in a pipelined manner with increased latency (step 204). Otherwise, the cache access is performed with minimal latency (step 205). Once the cache access has been performed, the process becomes idle (step 206) until another instruction fetch request is received for execution.

While the exemplary embodiment described herein relates to dynamically switching between one and two cycle cache accesses, the present invention is equally applicable to switching between one cycle cache accesses and cache access involving more than one cycle. For instance, a ½ (or any fractional amount) cycle may employed to match tags rather than a full cycle. The present invention may thus be employed to switch between one cycle and one-and-a-half cycle cache accesses, one cycle and three cycle cache accesses, etc.

FIG. 3 depicts the pipeline for both single cycle cache accesses and two cycle cache accesses according to one embodiment of the present invention. The pipelines illustrated are implemented within a dual MAC ST100 implementation processor core. As is apparent, single cycle accesses reduce the branch penalty for mis-predicted branches by one cycle, improving performance.

In the exemplary pipeline of FIG. 3, each box represents a processor cycle. Instruction fetch begins within the cache controller PMX, where at least one cycle P1 is utilized for both single-cycle and two-cycle cache accesses and a second cycle P2 is also utilized by two-cycle cache accesses (but not by single-cycle cache accesses). Within a control unit CU, an alignment operation AL and a decode operation DE each consume a single processor cycle.

In one path, one processor cycle is employed by each of the following stages: a dispatch to the address unit stage $DP_{AU}$, an address operand fetch stage AOF, and an address register execution stage ARP. In the other path, one processor cycle is employed by each of the following stages: a dispatch to the data unit stage $DP_{DU}$, a data operand fetch stage DOF, and either one or two execution phases EX1 and EX2, depending on the operation. A memory access request MRQ and memory access MEM then consumes a single processor cycle apiece.

Within the pipeline illustrated, the cache controller PMX may perform the cache access in only a single cycle P1 or in two cycles P1 and P2, and dynamically switches the cache access latency depending on whether a substantial performance penalty is incurred for the longer latency.

One circumstance under which cache accesses may be performed with increased latency but without substantial performance penalty involves instruction clusters within hardware loops. The core supports up-to three nested hardware loops with zero overhead branching. Zero overhead branching for hardware loops implies no branch penalty. This feature is employed extensively by digital signal processing kernels, which in turn may comprise up-to 80% of some applications. Since hardware loops incur no branch penalty, cache accesses within such hardware loops are capable of delivering almost equivalent performance in either single cycle or two cycle cache access modes.

The existing mechanism for indicating hardware loops to the core is by programming three parameters per hardware loop, namely: the start address of the hardware loop within the loop start register (LSR) 108; the end address of the hardware loop within the loop end register (LER) 109; and the repeat count for the hardware loop within the loop count register (LCR) 110. These addresses and counts are employed by a pre-fetch buffer logic 111 to detect execution of hardware loops. In addition, an individual on/off bit 112 per hardware loop (0, 1, 2) is set when a hardware loop is detected at the pre-fetch pipeline stage and the corresponding loop counter is not equal to 1, and cleared whenever any program discontinuity (branch, call, IT, trap, etc.) occurs, when a hardware loop coherency error occurs, or upon forced re-fetch due to a barrier instruction.

The following algorithm, given in pseudo-code, is employed to determine whether the core is executing a (possibly nested) hardware loop:

```
reg[2:0]    loopActive;        // 3-bit register indicates the active hardware loop.
reg         loopEnable;        // Hardware loops enabled.
reg[31:0]   LER[3];            // Loop End addresses for the three loops 0, 1, 2
reg[31:0]   LCR[3];            // Loop Counters 0, 1, 2
reg[31:0]   nextFetchAddr;     // Next Prefetch address
bool        match[3];          // match found
bool        inactiveCondition; // Set in case of a branch, call, IT, trap, hw loop coherency
bool        inLoop2PMX;        // Indicates inside Hardware Loop to PMX
//Logic @Prefetch stage of the pipeline.
for (i=0; i<3;i++) {
  match[i] = (nextFetchAddr == LER[i]) && (LCR[i] != 1); // Loop end match and not last iteration
}
for (i=0;i<3; i++)
  loopActive[i] = (Match[i] & loopEnable) & !inactiveCondition;
inLoop2PMX = loopActive[0] | loopActive[1] | loopActive[2];
```

The example pseudo-code listing above detects hardware loops based on a match of the loop end address. Alternative embodiments could include detection of a hardware loop based on the loop start address, utilizing explicit instruction encoding to indicate execution of a hardware loop to the cache latency control logic, or utilizing a branch predictor with appropriate logic to infer execution of a hardware loop.

Upon detecting execution of at least one hardware loop (including possibly nested hardware loops), the signal "inLoop2PMX" is driven to the cache controller 105 by the core. In response, the cache controller 105 switches to two-cycle cache access mode in a seamless manner and thereby provides power savings. Upon completing execution of the hardware loop(s), the cache controller 105 switches back to single cycle cache accesses. The switch between modes is therefore accomplished in a dynamic manner without explicit indication by the user program, with the processor 100 operating in one cycle cache access mode for non-DSP program segments and in two cycle cache access mode for hardware loops within DSP kernels, gaining significant savings in power consumption.

Performance benchmark results for execution of a complex block finite impulse response (CXFIR) kernel and a radix 4 fast Fourier transform (R4FFT) kernel are given below in TABLE II, while power consumption for a program segment including a hardware loop is given in TABLE III:

TABLE II

| Kernel | Description | 1-Cycle Latency | (Dynamic Switching) 2-Cycle Latency |
|---|---|---|---|
| CXFIR | Complex Block FIR Inner loop size = 2 SLIWs, fits inside prefetch buffer. Outer Loop greater than 4-SLIWs, accessed from cache. | 1329 | 1330 |
| R4FFT | Radix 4, FFT Inner and Outer loops are greater than 4 SLIWs | 2555 | 2555 |

TABLE II-continued

| Kernel | Description | 1-Cycle Latency | (Dynamic Switching) 2-Cycle Latency |
|---|---|---|---|
| | and therefore do not fit in the prefetch buffer | | |

TABLE III

| Unit | 1-Cycle Cache Access (uW/Mhz) | Dynamic Switching (uW/Mhz) |
|---|---|---|
| PMX: Control | 100* | 100* |
| PMX: Cache | 470* | 179* |
| Core: CXFIR | 490* | 490* |
| DMC: Data Memory Control | 100* | 100* |
| DM: Data Memory | 123* | 123* |
| Total Savings (≈20%) | 1283 uW/Mhz | 992 uW/Mhz |

As evident, the performance impact of dynamic switching between one and two cycle cache accesses for hardware loops is negligible. However, dynamic switching produces an overall savings of approximately 20% in power consumption over fixed one-cycle cache accesses for the same group of instructions. It is also evident from TABLE III that dynamic switching produces a savings of over 50% for the cache alone.

As noted above, in addition to the program cache the core includes a 4×128 bit internal pre-fetch buffer 112 capable of holding up to 4 SLIW instructions or up to 16 GP32 instructions. For this reason, additional power savings may be achieved for small hardware loops which fit within the pre-fetch buffer 112. In such instances, the PMX control logic may be placed in an idle state, thereby dropping power consumption for the PMX logic to a minimum. The pre-fetch buffer management logic computes the size of the hardware loop(s) every time the hardware loop start and end address registers are updated by the program. Where the pre-fetched hardware loop fits within the pre-fetch buffer 113, requests to the PMX logic are avoided and the PMX logic is sent into an idle state, and then restored upon completion of the loop.

While the example of FIG. 3 employs the loop end address to detect the end of a loop, the underlying concept may be easily modified for implementation within a processor architecture employing an explicit LOOP instruction to demarcate a hardware loop.

Figure 4:
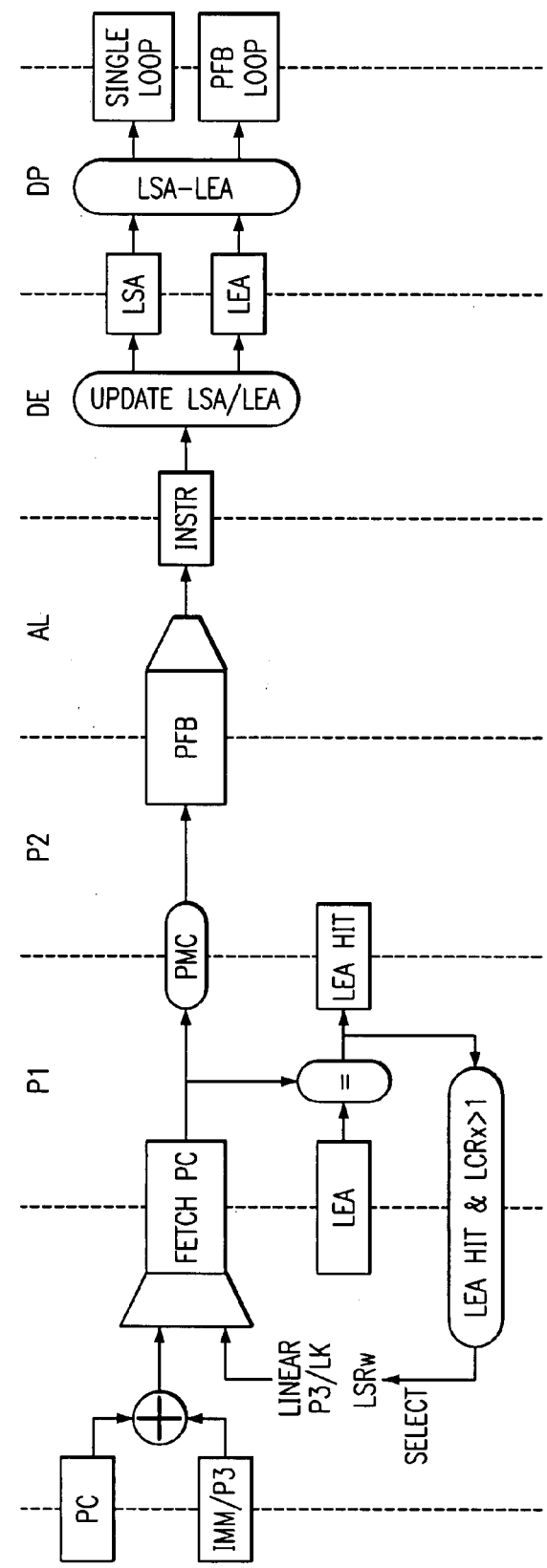
FIG. 4 illustrates a loop register pipeline for additional power savings during execution of hardware loops according to one embodiment of the present invention.

FIG. 4 illustrates a loop register pipeline for additional power savings during execution of hardware loops according to one embodiment of the present invention. The pre-fetch logic automatically determines whether each hardware loop is self-contained inside the pre-fetch buffer (i.e., less than the size of the pre-fetch buffer). If so, all further accesses to the code memory are blocked while the hardware loop is executing, achieving considerable additional power savings.

The pipeline begins with a fetch at the address of the next program counter (PC) value at the beginning of a first cache access cycle P1. For branching, the program counter receives either an immediate (Imm) address to which to jump, or an address increment from a program register P3 or link register LK to add to the current program counter. The program counter fetch function selects from among those values and determines the appropriate program counter address for the next instruction. The correct program counter is forwarded to the program memory controller PMC (part of the PMX cache controller) by the end of cycle P1.

In addition, the current program counter is compared (=) to the loop end address (LEA) for the currently executing loop. If a loop end address hit (match) is determined and the loop count register (LCR) for the currently executing loop (x=0, 1, 2) contains a value greater than one, the address within the loop start register (LSR) for the next higher loop (w=0, 1), if any, is selected by the fetch program counter function.

During cycle P2, the program memory controller loads the next instruction(s) into the program fetch buffer (PFB), with the instruction(s) being aligned during cycle AL to produce instructions INSTR ready for decoding. Instructions that set the loop start address (LSA) within the loop start register (LSR) and loop end address (LEA) within the loop end register (LER) are executed prior to execution of the hardware loop. The difference between the loop end address LEA within the loop end register LER and the loop start address LSA within the loop start register LSR is calculated (LEA−LSA) to determine whether the loop is capable of fitting entirely within the pre-fetch buffer. On a subsequent instruction fetch when the loop end address matches the fetch address, the corresponding loop count is greater than one, and the loop is characterized as fitting entirely within the pre-fetch buffer, the instruction is fetched from the pre-fetch buffer instead of the cache, thereby providing additional power savings. Under these circumstances, the pre-fetch buffer may be used when the core is in any of the execution modes, namely GP16, GP32 or SLIW.

The present invention allows lower-power execution of cache accesses where no significant performance penalty is incurred, while retaining shorter latency for other situations. While the exemplary embodiment relates to execution of hardware loops within a digital signal processor/microcontroller, similar instruction clusters may be identified for other types of processors utilizing different instruction set architectures (ISAs) with a set-associative cache.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. An apparatus for controlling execution of cache access instructions within a processor, comprising:
    an associative cache memory accessible either in a first mode or in a second mode having increased latency over the first mode; and
    a cache controller coupled to the associative cache memory and, during execution of a sequence of instructions,
        determining whether one or more cache access instructions may be executed with increased latency without incurring a substantial performance penalty for execution of the sequence of instructions, and
        responsive to determining that at least one cache access instruction within the one or more cache access instructions may be executed with increased latency but without incurring a substantial performance penalty, dynamically setting access of the cache memory to the second mode for the at least one cache access instruction, wherein the cache controller determines whether the one or more cache access instructions may be executed with increased latency but without incurring a substantial performance penalty by determining whether the sequence of instructions comprises a hardware loop.

2. The apparatus according to claim 1, wherein the cache controller dynamically sets access of the cache memory to the first mode upon completion of the sequence of instructions.

3. The apparatus according to claim 1, wherein the cache controller determines whether the sequence of instructions comprises a hardware loop by either comparison of a current program counter to a loop end address or detection of a loop identifying instruction.

4. The apparatus according to claim 1, wherein the cache controller, responsive to determining that the sequence of instructions comprises a hardware loop which fits within a pre-fetch buffer, idles the cache sub-system during any remaining subsequent iterations of the hardware loop.

5. The apparatus according to claim 1, wherein the cache controller automatically determines whether each cache access instruction may be executed with increased latency but without incurring a substantial performance penalty.

6. An apparatus for controlling execution of cache access instructions within a processor, comprising:
    an associative cache memory accessible either in a first mode or in a second mode having increased latency over the first mode; and
    a cache controller coupled to the associative cache memory and, during execution of a sequence of instructions,
        determining whether one or more cache access instructions may be executed with increased latency without incurring a substantial performance penalty for execution of the sequence of instructions, and
        responsive to determining that at least one cache access instruction within the one or more cache access instructions may be executed with increased latency but without incurring a substantial performance penalty, dynamically setting access of the cache memory to the second mode for the at least one cache access instruction,
    wherein the first mode comprises a single cycle access in which all ways of an indexed cache line within the cache memory are retrieved and the second mode comprises an access requiring more than one cycle and in which only a hit way within the indexed cache line is retrieved, and
    wherein the cache controller determines whether the one or more cache access instructions may be executed with increased latency but without incurring a substantial performance penalty by determining whether the sequence of instructions comprises a hardware loop.

7. A processor, comprising:
    one or more execution units executing instructions;
    a pre-fetch buffer containing instructions retrieved for execution by the execution units;
    an associative cache memory from which the pre-fetch buffer retrieves instruction, the associative cache memory accessible either in a first mode or in a second mode having increased latency over the first mode; and
    a cache controller coupled to the associative cache memory and, during execution of a sequence of instructions,
        determining whether one or more cache access instructions may be executed with increased latency without incurring a substantial performance penalty for execution of the sequence of instructions, and
        responsive to determining that at least one cache access instruction within the one or more cache access instructions may be executed with increased latency but without incurring a substantial performance penalty, dynamically setting access of the cache memory to the second mode for the at least one cache access instruction,
    wherein the cache controller determines whether the one or more cache access instructions may be executed with increased latency but without incurring a substantial performance penalty by determining whether the sequence of instructions comprises a hardware loop.

8. The processor according to claim 7, wherein the cache controller dynamically sets access of the cache memory to the first mode upon completion of the sequence of instructions.

9. The apparatus according to claim 7, wherein the cache controller determines whether the sequence of instructions comprises a hardware loop by either comparison of a current program counter to a loop end address or detection of a loop identifying instruction.

10. The apparatus according to claim 7, wherein the cache controller, responsive to determining that the sequence of instructions comprises a hardware loop which fits within a pre-fetch buffer, idles the cache sub-system during any remaining subsequent iterations of the hardware loop.

11. The apparatus according to claim 7, wherein the cache controller automatically determines whether each cache access instruction may be executed with increased latency but without incurring a substantial performance penalty.

12. The apparatus according to claim 7, wherein the first mode comprises a single cycle access in which all ways of an indexed cache line within the cache memory are retrieved and the second mode comprises an access requiring more than one cycle and in which only a hit way within the indexed cache line is retrieved.

13. A method of controlling execution of cache access instructions within a processor, comprising:
    during execution of a sequence of instructions including at least one cache access instruction for accessing an associative cache memory accessible while operating either in a first mode or in a second mode having increased latency over the first mode, determining whether one or more cache access instructions may be executed with increased latency without incurring a substantial performance penalty for execution of the sequence of instructions by determining whether the sequence of instructions comprises a hardware loop; and
    responsive to determining that at least one cache access instruction within the one or more cache access instructions may be executed with increased latency but without incurring a substantial performance penalty, dynamically setting access of the cache memory to the second mode for the at least one cache access instruction.

14. The method according to claim 13, further comprising:
    dynamically setting access of the cache memory to the first mode upon completion of the sequence of instructions.

15. The method according to claim 13, wherein the step of determining whether the sequence of instructions comprises a hardware loop further comprises:
- comparing a current program counter to a loop end address; or
- detecting a loop identifying instruction.

16. The method according to claim 13, further comprising:
- responsive to determining that the sequence of instructions comprises a hardware loop which fits within a pre-fetch buffer, idling at least a portion of a cache sub-system during any remaining subsequent iterations of the hardware loop.

17. The method according to claim 13, further comprising:
- automatically determining whether each cache access instruction may be executed with increased latency but without incurring a substantial performance penalty.

18. The method according to claim 13, wherein the first mode comprises a single cycle access in which all ways of an indexed cache line within the cache memory are retrieved and the second mode comprises an access requiring more than one cycle and in which only a hit way within the indexed cache line is retrieved.

* * * * *